Sept. 15, 1959 P. W. BAILEY 2,904,131
STREET CONVEYOR MAIL, NEWSPAPER AND MILK PRODUCTS BOX
Filed June 16, 1958 3 Sheets-Sheet 3

INVENTOR.
PAUL WILLIAM BAILEY
BY
Carl Miller
ATTORNEY

United States Patent Office 2,904,131
Patented Sept. 15, 1959

2,904,131

STREET CONVEYOR MAIL, NEWSPAPER AND MILK PRODUCTS BOX

Paul William Bailey, Oakland, Calif.

Application June 16, 1958, Serial No. 742,141

1 Claim. (Cl. 186—1)

This invention relates to household equipment and, more particularly, to a delivery system for homes.

Ordinarily, it is either necessary for a delivery man to carry the material being delivered all the way to the house from the street, or it is conversely necessary for the home owner to leave the house and walk to the street in order to recover delivered material. This is an inconvenience, particularly in rural areas where there is a substantial distance between the house and the road. It is therefore an object of the present invention to provide a unique delivery service conveyor system for homes that is extremely simple in construction, efficient in operation, and which will overcome the aforementioned difficulties.

Another object of the present invention is to provide a delivery service conveyor system which will enable a delivery man to deliver various types of small articles without having to leave the vehicle in which he is travelling.

Another object of the present invention is to provide a delivery service conveyor system of the type described in which it is also unnecessary for the home owner to leave the house in order to recover the delivered products.

Still a more specific object of the present invention is to provide a delivery service conveyor system of this type which will automatically conduct the delivered products from a point adjacent to the road into the interior of the house without having to open the door or windows of the house at any time.

Still another object of the present invention is to provide an underground delivery service conveyor system for homes which can be manufactured, fabricated, and installed at a minimum cost and which is substantially foolproof and safe in operation.

All of the foregoing and still further objects and advantages of this invention will become apparent from a study of the following specification, taken in connection with the accompanying drawing, wherein.

Figure 1:
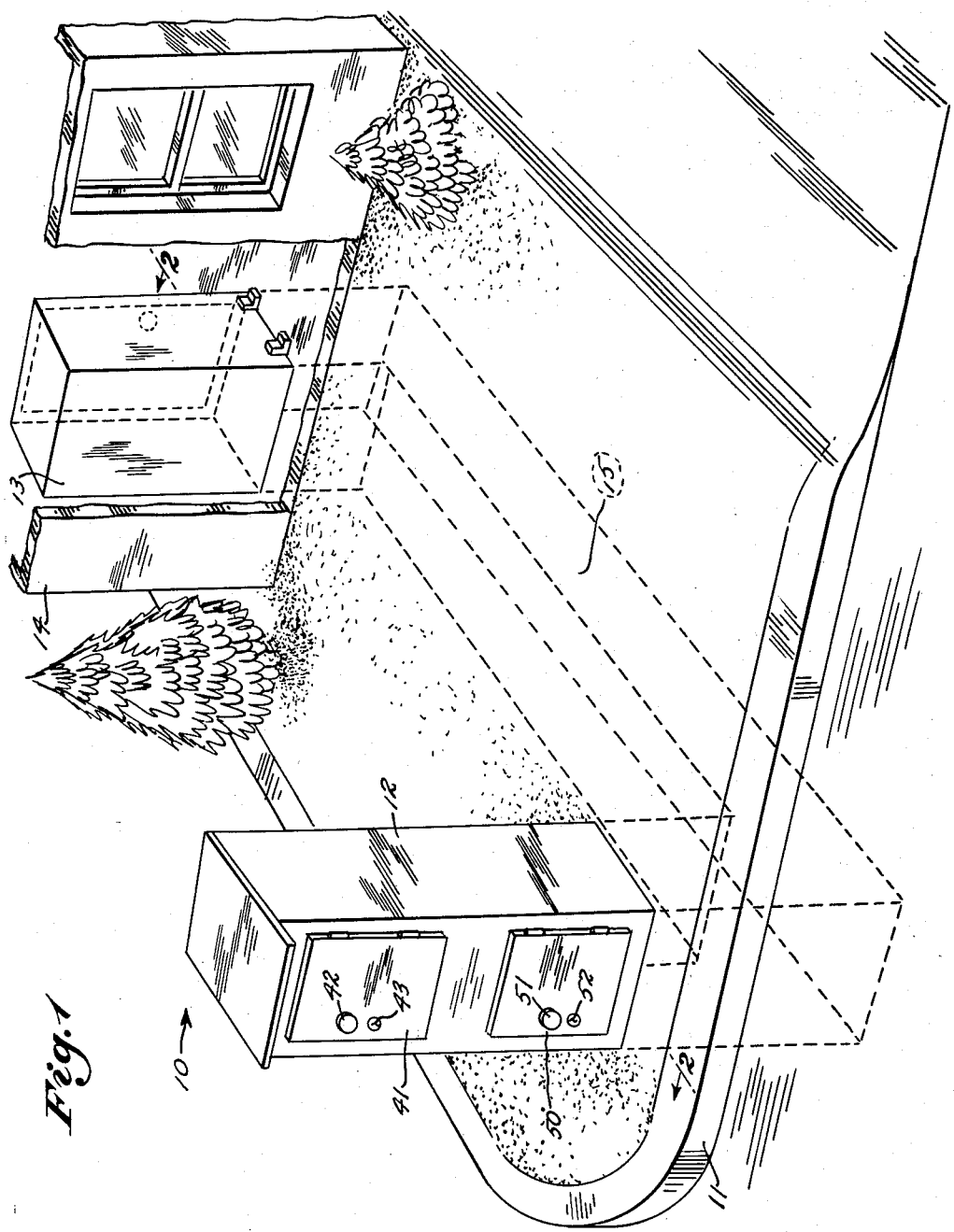
Figure 1 is a perspective view, with parts broken away, of a home delivery service conveyor system made in accordance with the present invention.
Figure 2:
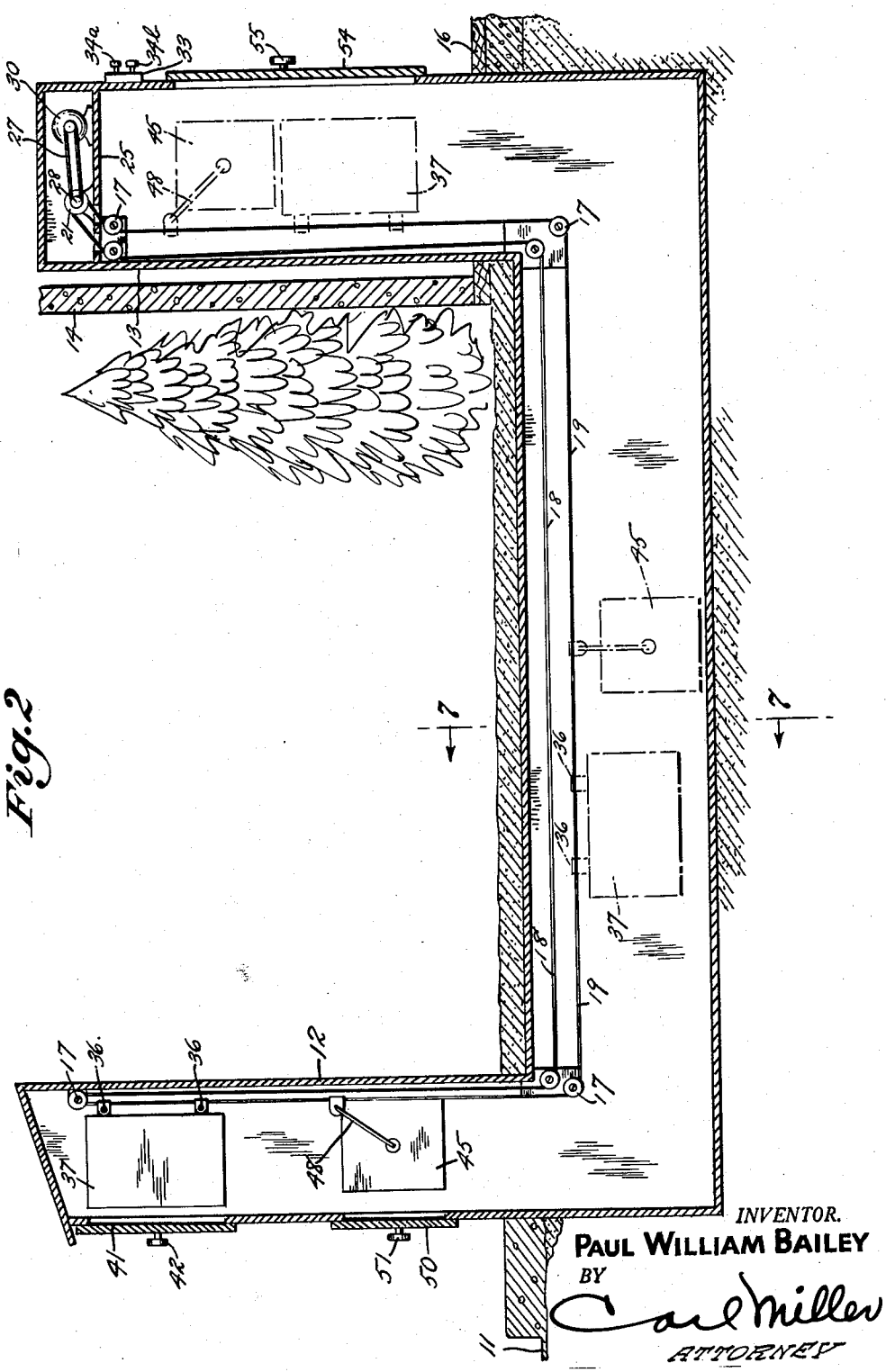
Figure 2 is a longitudinal cross sectional view taken along line 2—2 of Figure 1.
Figure 3:
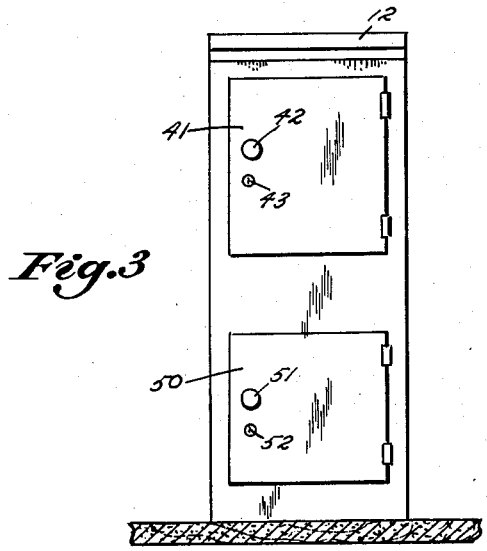
Figure 3 is a front elevational view of an exterior station forming a part of the present invention.
Figure 4:
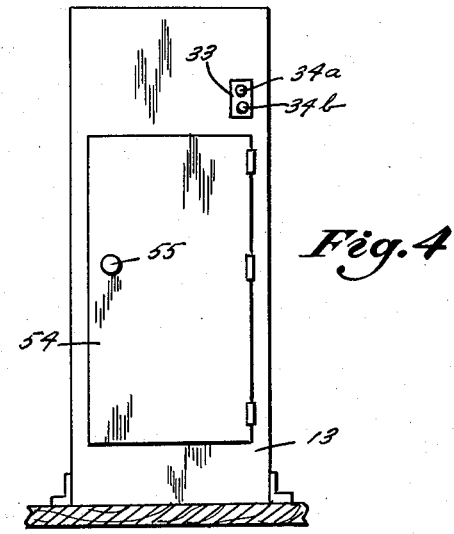
Figure 4 is a front plan view of an interior station forming another part of the present invention.

Referring now to the drawing, and more particularly to Figures 1 and 2 thereof, a home delivery service conveyor system 10 made in accordance with the present invention is shown to include an exterior station in the form of an enclosure 12 secured outside of the house 14 adjacent to the roadway 11, and an interior station in the form of an inside enclosure 13 secured upon the floor 16 within the house 14. A continuous duct 15 communicates between the bottom of the outside enclosure 12 and the bottom of the inside enclosure 13 and extends beneath the surface of the lawn or sidewalk between the roadway and the house. Thus, the duct 15 is completely hidden from view, only the outside enclosure 12 being at all visible from the outside of the house 14.

A plurality of guide pulleys 17 effectively guide and support the upper and lower runs 18, 19 of a pair of endless belts that are supported in spaced apart side by side parallel relationship. A pair of drive pulleys 21 secured to the opposite ends of a shaft 22 which is rotatably supported within a bearing 24 mounted upon a platform 25 within the inside of the interior enclosure 13, effects movement of the upper and lower runs of the endless conveyor belts, in a manner hereinafter more fully described. A smaller pulley 28 is also secured to the shaft 22, this smaller pulley 28 being driven by a drive pulley 29 secured to the drive shaft of a reversible electric motor 30. This motor 30 is connected to a source 32 of electrical energy through a manually operated switch 33, one of the contacts of this switch 33 is connected directly to the common terminal of the motor 30, while the other contact includes two terminals which are movable by manually operated buttons 34a, b into electrical contact with either one of the terminals of the motor, so as to enable the motor to be driven in either direction depending upon which one of the buttons 34a, b is depressed. As a result, the lower run 19 of the belts can be selectively moved in either direction to control the operation of the conveyor system.

Figure 5:
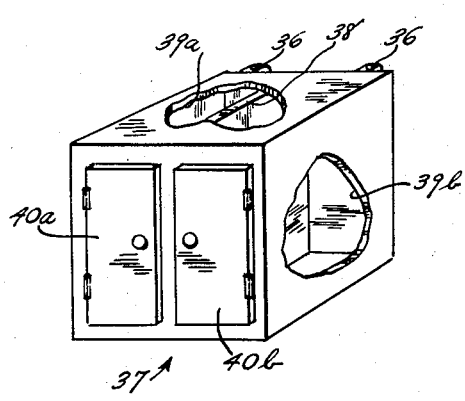
Figure 5 is a perspective view, with parts broken away, of a cubicle container forming another part of the present invention.
Figure 6:
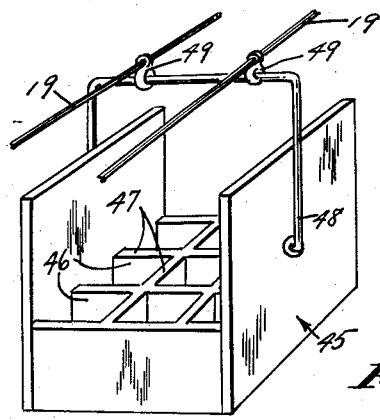
Figure 6 is a perspective view of a carriage forming another part of the present invention.
Figure 7:
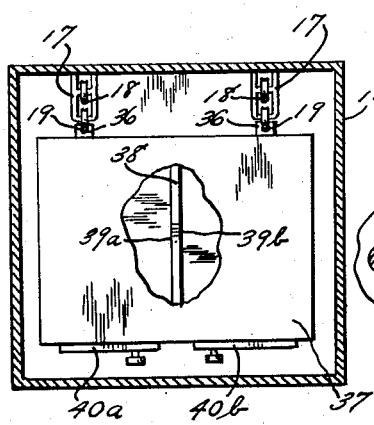
Figure 7 is an enlarged transverse cross sectional view taken along line 7—7 of Figure 2.
Figure 8:
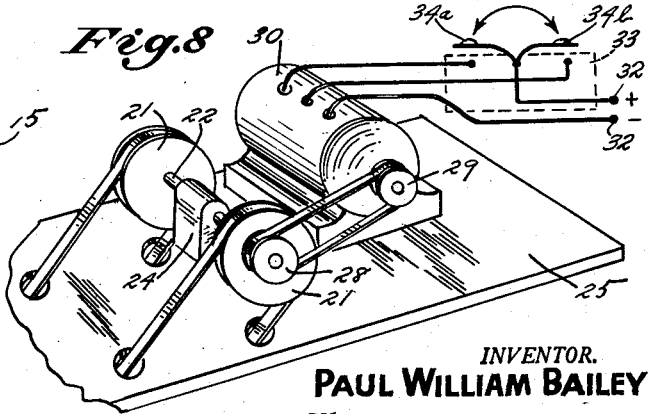
Figure 8 is a fragmentary perspective view of the motive power apparatus forming another part of the present invention.

A cubicle container 37, as shown in Figure 5, has an inside partition wall 38 that divides the interior thereof into two separate compartments 39a, b, each of which is provided with an individual access door 40a, b, respectively. The wall of the container opposite the access doors is provided with a plurality of attachment elements 36 which are secured to the lower runs 19 of the conveyor belts for movement therewith. An exterior access door 41 in the exterior enclosure 12 is provided with a handle 42 and lock 43 so that it can be opened to gain access to the interior of the individual compartments 39a, b, of the container. One such compartment 39a is for newspapers, while the other such compartment 39b is for mail.

A partially open container 45 divided into individual cells 46 by partitions 47 is particularly suited for receiving food products, such as bottles of milk, bread, eggs, and the like. This container 45 is supported upon the lower runs 19 of the conveyor belts by means of a bail 48 in which the ends thereof are connected to the sides of the container and the base portion thereof is connected by means of pivotal brackets 49 to adjacent points of the lower runs 19 of the belts. An outside access door 50 on the exterior enclosure 12 provides access to the container 45 to enable the delivery man to place the food products therewithin. This door 50 is provided with an individual handle 51 and separate lock 52 to control the opening and closing thereof.

It will be noted that the closed container 37 is immovably affixed to the lower runs 19 of the conveyor belts so that it is completely inverted from the starting position within the exterior housing 12 to the end position within the inside enclosure 13. Since this container does not receive any fragile or breakable material, such is of no consequence. The partially open container 45, however, receives fragile articles, such as bottles and containers, whereby it is important that it remains in the upright position throughout all parts of its travel.

The bail 48 enables this container to be so supported in the upright position as it moves from the initial to the final position through the connecting duct. While this container 45 may be emptied from either side, the access doors 40a, b in the closed container 37 can only be opened from one side, whereby it is necessary to have the inside access door 54 of the interior enclosure 13 open in a direction opposite to that of the direction in which the access doors 41, 50 on the outside enclosure 12 open. A handle 55 is provided to open this inside access door from within the house 14.

In actual use, each delivery man is given a key to open the respective access door 41, 50 so that after the products are deposited, the door is automatically locked by the associated locks 43, 52, whereby the articles contained therewithin are completely safe until the occupant within the house depresses the upper button 34a to drive the conveyor system to carry the container into the interior housing 13. After the products have been removed from these constainers, the lower button 34b is depressed to return the containers to the exterior compartment.

While this invention has been described with particular reference to the construction shown in the drawing, it is to be understood that such is not to be construed as imparting limitations upon the invention, which is best defined by the claim appended hereto.

Having thus described my invention, I claim as new and desire to secure by Letters Patent:

A delivery service conveyor system comprising, in combination, an exterior station adjacent to a public thoroughfare, an interior station within a private dwelling, an underground passageway connecting said exterior and interior stations, guide means extending through said underground passageway between said exterior and interior stations, carriage means supported upon said guide means, motive power drive means for effecting movement of said conveyor means along said guide means between said stations, said guide means comprising a pair of endless belts, guide pulleys supporting said endless belts and spaced apart side by side relationship within said interior and exterior stations and said passageway, said motive power means comprising a reversible motor having a drive shaft, switch means controlling the direction of rotation of said drive shaft, pulley means drivingly connecting said drive shaft to said endless belt, said carriage means comprising a cubical container, a partition within said container providing the interior thereof into two separate compartments, and separate access doors on one side of said container providing individual access means to the interior of said compartments, said conveyor means further comprising a partially open container, partitions dividing the interior of said partially open container into a plurality of individual food product receiving cells, attachment means connecting said partially open container to said endless belts in a constantly upright position, said attachment means comprising a bail pivoted at opposite ends to said partially open container, and bracket means pivotally connecting the base of said bail to adjacent portions of said endless belts, said exterior station comprising a vertical housing having vertically spaced apart access doors, said endless belts extending upwardly within said housing along a wall opposite said access doors for guiding said cubical and partially open containers into alignment with said access doors, said interior station comprising a vertical housing having a single access door on one side, said endless belts extending upwardly within said housing along a wall opposite said access doors for guiding said cubical and partially open containers into alignment with said access doors.

References Cited in the file of this patent

UNITED STATES PATENTS

| | | |
|---|---|---|
| 1,724,196 | Harrison | Aug. 13, 1929 |
| 2,044,391 | Lindsay | June 16, 1936 |
| 2,613,762 | McClintock | Oct. 14, 1952 |